United States Patent
Tyler

[11] 3,975,669
[45] Aug. 17, 1976

[54] ELECTRONIC DAMPER MOTOR CONTROL

[75] Inventor: Hugh Jean Tyler, Santa Ana, Calif.

[73] Assignee: Robertshaw Controls Company, Richmond, Va.

[22] Filed: Nov. 18, 1974

[21] Appl. No.: 524,532

[52] U.S. Cl. .............................. 318/624; 318/672; 318/674; 318/678; 324/98
[51] Int. Cl.² .......................................... G05B 5/01
[58] Field of Search ........... 318/611, 624, 674, 678, 318/672, 681; 324/98, 99 R; 323/19, 24, 25

[56] References Cited
UNITED STATES PATENTS

| | | | |
|---|---|---|---|
| 3,517,285 | 6/1970 | Kundler | 318/624 |
| 3,639,824 | 2/1972 | Malavasi | 318/678 |
| 3,686,557 | 8/1972 | Futamura | 318/678 |
| 3,725,771 | 4/1973 | Gilmore | 318/624 |
| 3,736,486 | 5/1973 | Gould et al. | 318/624 |

Primary Examiner—Robert K. Schaefer
Assistant Examiner—John J. Feldhaus
Attorney, Agent, or Firm—Fulwider, Patton, Rieber, Lee & Utecht

[57] ABSTRACT

There is disclosed a motor control circuit that is particularly useful for the control of a damper motor in a heating and ventilating system. The control circuit comprises a bridge circuit having a pair of operational amplifiers with cross connected input terminals. An input signal is provided by input signal circuit means to one of the cross-connecting conductors and a reference signal is provided to the other of the conductors by a reference signal circuit means. The operational amplifiers are provided with feedback circuit means between their output and noninverting terminals to drive the amplifiers into an unstable condition where they function as on and off switches. Dead band means in the form of a load dropping resistor is provided between the input signal circuit and the noninverting terminal of one of the amplifiers. The reference voltage signal supplied to the amplifiers is derived from a voltage divider circuit which is responsive to the motor position, thereby effecting proportional control of the motor. The feedback to the noninverting terminal of the amplifiers effects a latch-on condition whereby the circuit is held in the middle of the dead band, effecting a stepping action of the motor in response to an error signal, thereby eliminating hunting or oscillating of the motor and minimizing the frequency of making and breaking the switch contacts.

7 Claims, 3 Drawing Figures

U.S. Patent   Aug. 17, 1976   3,975,669
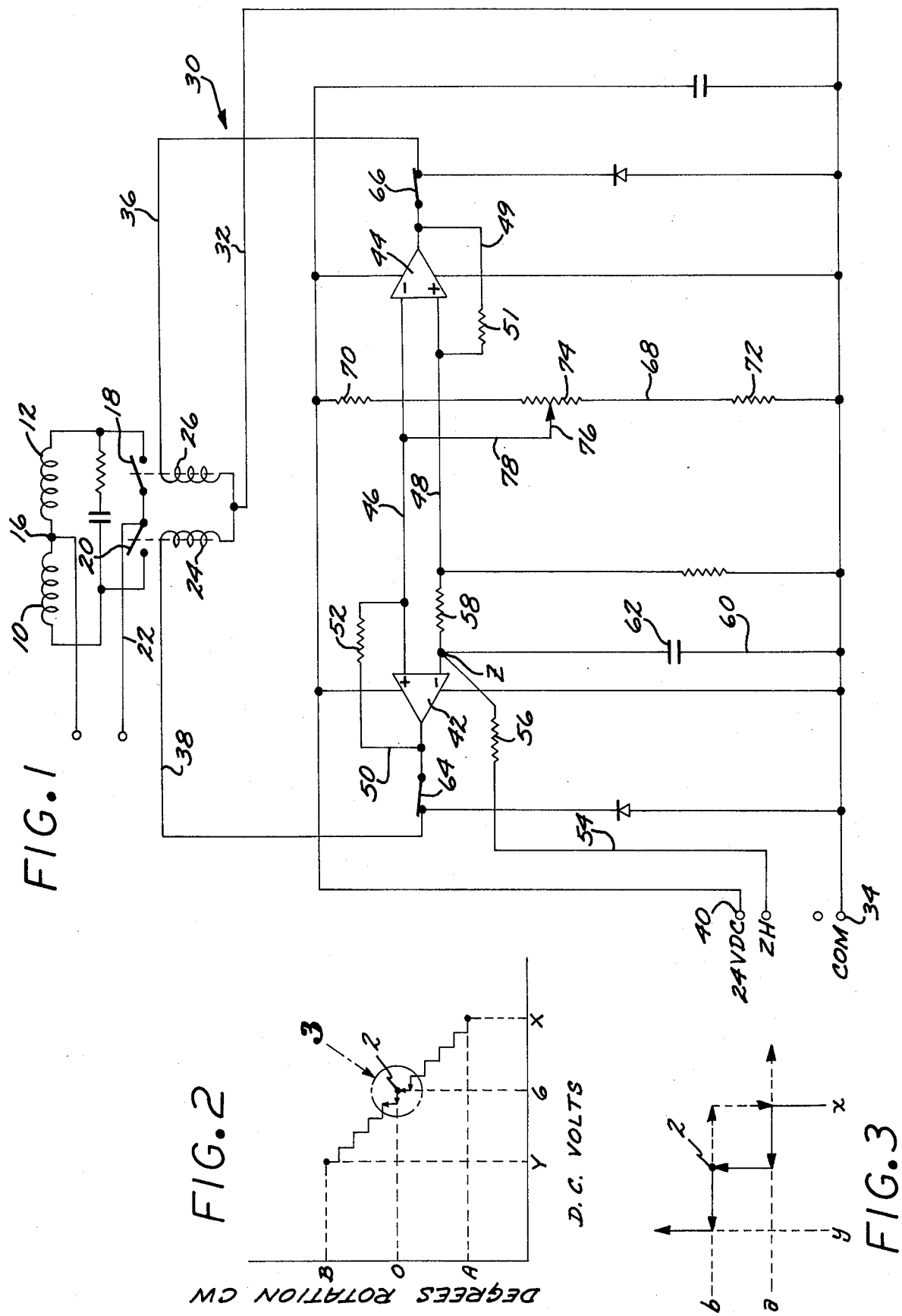

ELECTRONIC DAMPER MOTOR CONTROL

BACKGROUND OF THE INVENTION

1. Field of Invention

This invention relates to a motor control circuit and, in particular, to a control circuit suited for the control of direction and magnitude or rotation of a motor on a damper of a heating and ventilating system.

2. Brief Statement of the Prior Art

Heating and ventilating systems commonly employ local zone dampers which are actuated between open and closed positions by a motor that is controlled by means responsive to the temperature sensed by a thermostatic device in the control zone. Commonly, air circulated to the control zone is heated and/or cooled in hot and cold decks of central, roof top air conditioning systems and each control zone in a building has an air duct that receives air from either or both of the heating and cooling decks. The dampers to the hot and cold decks, which proportion the hot and cold air supplied to the air ducts leading to each control zone are usually mounted on a common shaft that is actuated by a single damper motor mechanically connected thereto by levers, screw threads and the like. In some systems, the dampers have a mechanical or electrical feedback so that the control of the motor is proportional to the displacement of the damper, thereby minimizing some of the hunting or oscillation of this drive motor.

To minimize fatigue and wear on the mechanical drive system and to minimize wearing of the motor electrical switch contacts, it is desirable to provide means whereby error signals of minor magnitude do not actuate the damper motor. Accordngly, it is desirable to provide dead band means in the motor controller about the command signal input and to provide the circuit with discriminating capability to eliminate response to input signals of less than a predetermined magnitude.

BRIEF STATEMENT OF THE INVENTION

This invention provides a control circuit for a motor such as a damper actuator motor and the like with dead band means in the input circuit whereby the control circuit discriminates against error signals of less than a preselected value. The motor control circuit of the invention includes a pair of cross-connected, operational amplifiers which are biased, by feedback loops to their non-inverting terminals, into an unstable condition where the amplifiers function as on and off switches.

The damper actuator motor is provided with separate windings in its stator or armature for clockwise and counterclockwise rotation. Each of the operational amplifiers has its output terminal connected in circuit to one of the two windings of the motor when its respective operational amplifier is switched to the conducting mode.

The input voltage command signal is applied by input signal circuit means to one of the cross connecting conductors. This cross conductor also includes voltage dropping means in the form of a load resistor between the input signal circuit means and the non-inverting terminal of the other operational amplifier.

The control circuit also includes reference voltage circuit means connected to the other of the cross connectors between the operation amplifiers and this circuit means includes a voltage divider that is mechanically coupled to the damper motor whereby movement of the motor effects a proportional change in the voltage divider.

The feedback between the output and the noninverting terminals of the operational amplifiers drives these amplifiers into an unstable mode whereby they function as switches. The voltage dropping resistor provides a dead band between the inputs to the two amplifiers and the feedback circuit enters the control circuit in the middle of this band, whereby they function as switches. The voltage dropping resistor provides a dead band between the inputs to the two amplifiers and the feedback circuit centers the control circuit in the middle of this band, thereby functioning as a discriminating network which requires input error signal voltages greater than a predetermined magnitude, which is half the dead band value to effect movement of the motor.

BRIEF DESCRIPTION OF THE DRAWINGS

The invention will be described by reference to the figures of which:

FIG. 1 illustrates the control and motor circuits; and

FIGS. 2 and 3 illustrate the stepping action of a motor controlled by the circuit of the invention.

DESCRIPTION OF PREFERRED EMBODIMENT

The control circuit of the invention is applied to the control of the direction and rotational displacement of an electric motor. In its preferred embodiment, the invention is applied to the control of a motor used as a damper actuator in an air conditioning system such as that described in my copending application, Ser. No. 499786 filed Aug. 8, 1974, now published application B499786. The damper motor has parallel windings 10 and 12 in its stator or armature and is supplied with a power source such as a 110–120 volt alternating current supply at 14. The windings have a common terminal 16 and their opposite terminals are connected through relay switch contacts 18 and 20 to the common lead 22 from the power source 14. The relays have opposite windings 24 and 26 which are in the low voltage control circuit network 30. This network includes common lead 32 that leads to the common or ground, low voltage terminal 34 and individual leads 36 and 38 from each of the windings 26 and 24, respectively. Leads 36 and 38 are connected through the control circuit of the invention to the opposite, low voltage, supply terminal 40. Typically, a direct current low voltage supply can be connected across terminals 30 and 34, e.g., from 12 to about 30 volts, preferably about 24 volts D.C.

The control circuit for the damper motor includes a pair of operational amplifiers 42 and 44 which are cross connected by cross conductors 46 and 48 that extend between the inverting and the non-inverting terminals of these operational amplifiers. Each operational amplifier has a feedback circuit comprising leads 50 and resistor 52 for amplifier 42 and lead 49 and resistor 51 for amplifier 44 in circuit from their output to their non-inverting input terminals, thereby driving these amplifiers into unstable modes.

The voltage command signal is applied to the ZH terminal and through the input signal circuit which includes conductor 54 and resistors 56, 58 and 59 to the inverting terminal of operational amplifier 42. Resistors 56 and 58 form a voltage divider so that the input voltage applied to the control circuit is about half the value of the command voltage from the thermostat which is applied across the ZH and COM terminals. The input signal circuit forms one leg of the bridge of the motor control circuit. The non-inverting terminal of operational amplifier 44 is connected to the input signal circuit through voltage dropping means including resistor 58 which acts to impose a slightly lower voltage on the non-inverting terminal of operational amplifier 44 than is imposed on the inverting terminal of operational amplifier 42. The value of resistance for resistor 58 can be varied as desired to provide a predetermined voltage drop between these terminals, typically this voltage drop can be from about 0.02 to about 0.2 volts, preferably about 0.05 volts for the 24 volts D.C. circuit. The input signal circuit is grounded to the common terminal 34 through connector 60 which has capacitor 62 in circuit therewith to provide filter means to shunt momentary peak voltages to the common terminal.

The output terminal of operational amplifier 42 is connected through limit switch means 64 to lead 38 and coil 24 of the left relay contact for the motor control circuit. The output terminal of the right operational amplifier 44 is similarly connected through limit switch 66 to lead 36 and relay coil 26 of the right relay contact of the motor control circuit.

The reference signal circuit means, which forms a leg of the bridge circuit of the motor control circuit comprises lead 68 which extends across the low voltage supply terminals of the circuit and includes load dropping resistors 70 and 72 and a voltage divider in the form of a potentiometer 74 having a wiper contact 76 that is mechanically linked to the actuating mechanism between the damper and the damper motor.

Commonly, the damper motor has a jack screw shaft on which is mounted a traveling nut member that is attached to the damper of the heating and ventilating system. Preferably, potentiometer 74 comprises a linear resistor having its windings coated with a wear-resistant, conductive plastic coating to provide a smooth surface that resists accumulation of dust and dirt. The wiper blade 76 is mechanically coupled to the actuating mechanism of the damper and is responsive to the position of the damper. Accordingly, this wiper blade 76 is displaced in the directional of and in proportion to the magnitude of rotational displacement of the armature of the electric motor.

The application of a voltage signal through conductor 54 and resistor 56 to the operational amplifiers unbalances the bridge circuit in the direction of the command signal. Thus, if the circuit is balanced at the midpoint of the displacement of the damper mechanism, the two sides of the potentiometer 74 are equal and approximately 6 volts is applied to cross conductor 46, balancing the 6 volt input signal supplied by the voltage divider 56, 58 and 59 from a 12 volt thermostat signal across the ZH and COM terminals. If the input voltage applied between the common and ZH terminals should change, e.g., increase to 13 volts as caused by an increase in temperature at the thermostat, the bridge circuit is unbalanced by the application of 6.5 volts less than the voltage drop of about 0.05 volts through resistor 58 to the non-inverting terminal of the right operational amplifier. The application of this voltage command signal to operational amplifier 44 acts to switch this amplifier into a conducting mode, generating an output signal at its output terminal which is applied through coil 26 of the relay, closing the contacts 18 and causing current flow through the winding 12 of the motor, turnings its armature counterclockwise. The feedback circuit through conductor 49 and resistor 51 also raises the voltage applied to the noninverting terminal of operational amplifier 44. The value of resistor 51 is chosen to provide an incremental feedback voltage of about half the voltage drop through dead band resistor 58, e.g., about 0.025 volts.

Movement of the motor shaft effects a proportional displacement of wiper contact 76, shifting this contact upward in the diagram and increasing the voltage applied through conductor 78 to the inverting terminal of amplifier 44. When this voltage applied to the inverting terminal reaches the voltage applied to the non-inverting terminals, amplifier 44 turns off, stopping the counterclockwise rotation of the motor. The value of the voltage supplied from potentiometer 74 is, therefore, the voltage of the input signal (6.5 volts) less the voltage drop through resistor 58 (0.05 volt) plus the feedback voltage (0.025 volt).

When amplifier 44 turns off, the voltage developed at its output terminal is removed and the feedback voltage through lead 49 is removed resulting in a voltage at the noninverting terminal calculated as follows: 6.475—0.025=6.450. The feedback circuit to the amplifier thus functions to place the null position of the bridge circuit in the middle of the dead band by removal of the feedback voltage through conductor 49. That is the signal from the command signal voltage divider (56, 58 and 59) 6.5 volts must move down 0.025 volt to go below the voltage on conductor 46 to turn on amplifier 42 or must move up 0.025 volt to raise conductor 48 above the voltage on conduct 46 to turn on amplifier 44.

Referring now to FIGS. 2 and 3, there is illustrated the response of the motor to the application of a slowly rising command voltage signal. If the motor and damper mechanism is at a null position at a suitable voltage from the command voltage divider network, e.g., 6 volts (point 2), the application of a signal to the input of the control circuit which is slightly greater than 6.025 volts, e.g., voltage $x$, will result in biasing operational amplifier 44 into conducting mode. This will cause counter-clockwise rotation of the motor until damper position a is reached at which time the control circuit is balanced at input voltage $x$. The voltage applied to cross connector 46 which balances the input voltage is the value of voltage $x$ less the voltage drop through resistor 58 and plus the feedback voltage or, for the specific example, $x$—0.050+0.025=6.000+volts (slightly above 6V). This sequence of steps is shown by the broken lines in FIGS. 2 and 3. Limit switch 66 can be mechanically coupled to the damper motor to open at position A and X volts, e.g., slightly in excess of 6.5 volts at point Z. The limit switch is optional.

The opposite effect occurs when the thermostat develops a potential below 12 volts and a signal less than 5.975 volts is applied to point Z. The application of the voltage signal through the input circuit activates the left operational amplifier 42 and an output voltage is developed through limit switch 64, lead 38 and coil 24 of the relay, closing contacts 20 and permitting current flow through winding 10 of the motor to cause clockwise rotation of the motor shaft. The feedback circuit is effective to apply approximately 0.025 volt feedback circuit to the noninverting terminal of this amplifier which is additive to the reference voltage signal on conductor 46 generated by the voltage divider network of potentiometer 74. As the damper is moved in response to the motor, the wiper contact is moved downwardly on the potentiometer 74, as shown on the schematic which lowers the voltage applied to the noninverting terminal of the amplifier 42 until the sum of this voltage and the feedback voltage is in balance with the voltage signal applied to the inverting terminal of this amplifier, e.g., (slightly less than 5.975 volts) voltage 6. When this occurs the amplifier shuts off and clockwise motor movement ceases at position b. This also removes the feedback voltage supplied through the feedback circuit of lead 50 and resistor 52, requiring a further decrease of at least 0.025 volt in the input signal at point Z before the circuit will again operate the damper motor in the clockwise direction. This sequence of steps is shown by the solid lines of FIGS. 2 and 3. A limit switch 64 can optionally be provided and mechanically coupled to the damper motor to open at position B and Y volts; see FIG. 2.

The control circuit as thus described utilizes a pair of cross-connected operational amplifiers as switches in a control circuit. The control circuit is provided with discriminating means in the form of a load dropping resistor between the cross-connected input terminals of the amplifier to provide a dead band between the response of the amplifiers to command voltage signals. The feedback circuit means is effective in stopping the damper motor in the middle of a dead band, thereby insuring that the next signal change must be greater than about ± 0.025 volts at point Z or ± 0.050 volt change in command signal to cause the control circuit to activate the motor.

The control circuit is a bridge circuit having a voltage divider input signal circuit including lead 54 and resistors 56, 58 and 59 and a voltage divider reference signal circuit which includes potentiometer 74. This control circuit is ideally suited for the control of the electric motor in a damper actuator; however, the circuit could be equally applicable for the control of other electric motors in which a proportional control is desired.

The invention has been described with reference to the presently illustrated and preferred embodiment thereof. It is not intended that the invention be unduly limited by this illustration of presently preferred embodiments but, instead, that the invention be defined by the means, and their obvious equivalents set forth in the following claims.

What is claimed is:

1. A control circuit comprising a pair of operational amplifiers with a common voltage power supply connected to ground and voltage supply terminals thereof, said operational amplifier having inverting and non-inverting input terminals cross-connected by first and second cross conductors, input means to each of said conductors comprising input signal circuit means in circuit to the first of said cross conductors, reference signal circuit means in circuit to the second of said cross conductors, dead band means for discriminating input error signals of predetermined magnitude comprising resistance means in one of said cross conductors between one of said input terminals of said operational amplifiers and its respective input means, and voltage feedback circuit means connected between the output and non-inverting terminals of each of said operational amplifiers.

2. The control circuit of claim 1 comprising a pair of operational amplifies with cross-connected input terminals by first and second cross conductors, input signal circuit means in circuit to the first of said cross conductors, reference signal circuit means in circuit to the second of said cross conductors, and feedback circuit means between the output and non-inverting terminals of each of said operational amplifiers to drive said amplifiers into an unstable condition.

3. The control circuit of claim 1 wherein proportionating means are provided in said reference signal circuit means including voltage divider means responsive to the output of said control circuit.

4. The control circuit of claim 1 in combination with a reversible electric motor wherein the output of said operational amplifiers are in operative connection to control the direction of rotation of said electric motor.

5. The control circuit of claim 4 wherein proportionating means are provided in said reference signal circuit means including voltage divider means in driven mechanical connection to said electric motor.

6. The control circuit of claim 1 wherein said input signal circuit means includes a cross conductor to the ground terminal of the circuit with filter capacitor means therein.

7. The control circuit of claim 1 wherein said voltage feedback circuit means includes voltage divider means responsive to the direction and magnitude of rotation of the damper motor output shaft.

* * * * *